April 15, 1952 — G. EATON — 2,593,124
WEDGE FACING MACHINE
Filed Sept. 23, 1948 — 4 Sheets-Sheet 1

Inventor
GERALD EATON
By Lindsey, Prutzman & Just
Attorneys

April 15, 1952 G. EATON 2,593,124
WEDGE FACING MACHINE
Filed Sept. 23, 1948 4 Sheets-Sheet 2
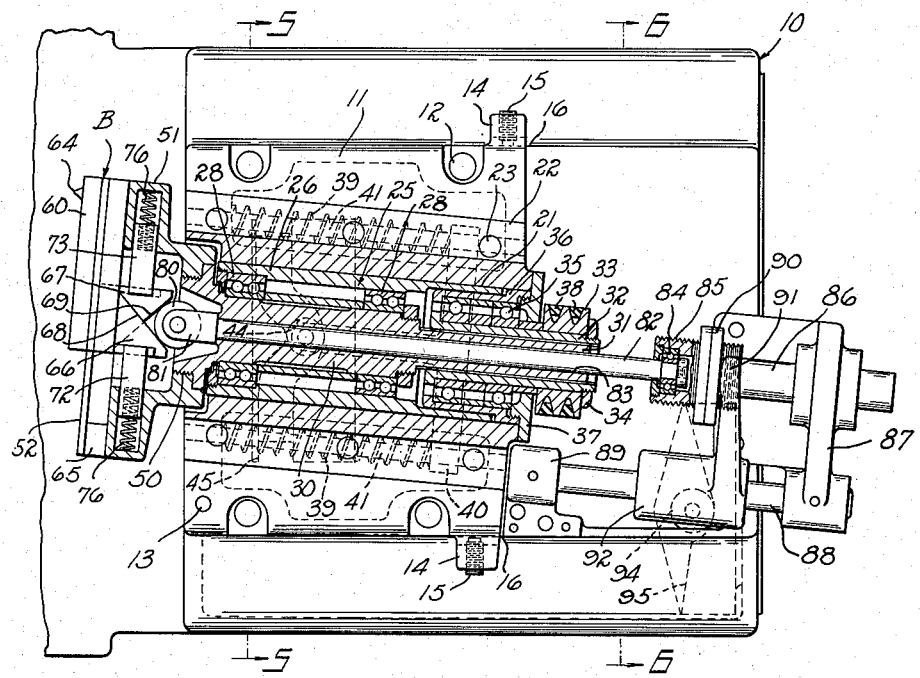
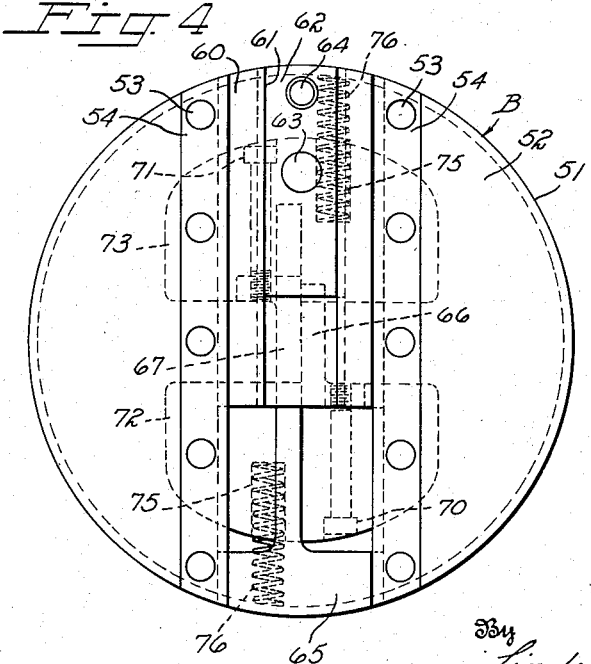
Inventor
GERALD EATON
By
Lindsey, Prutzman + Just
Attorneys April 15, 1952 — G. EATON — 2,593,124
WEDGE FACING MACHINE
Filed Sept. 23, 1948 — 4 Sheets-Sheet 3

Inventor
GERALD EATON
By Lindsey, Prutzman + Just
Attorneys

April 15, 1952 G. EATON 2,593,124
WEDGE FACING MACHINE
Filed Sept. 23, 1948 4 Sheets-Sheet 4
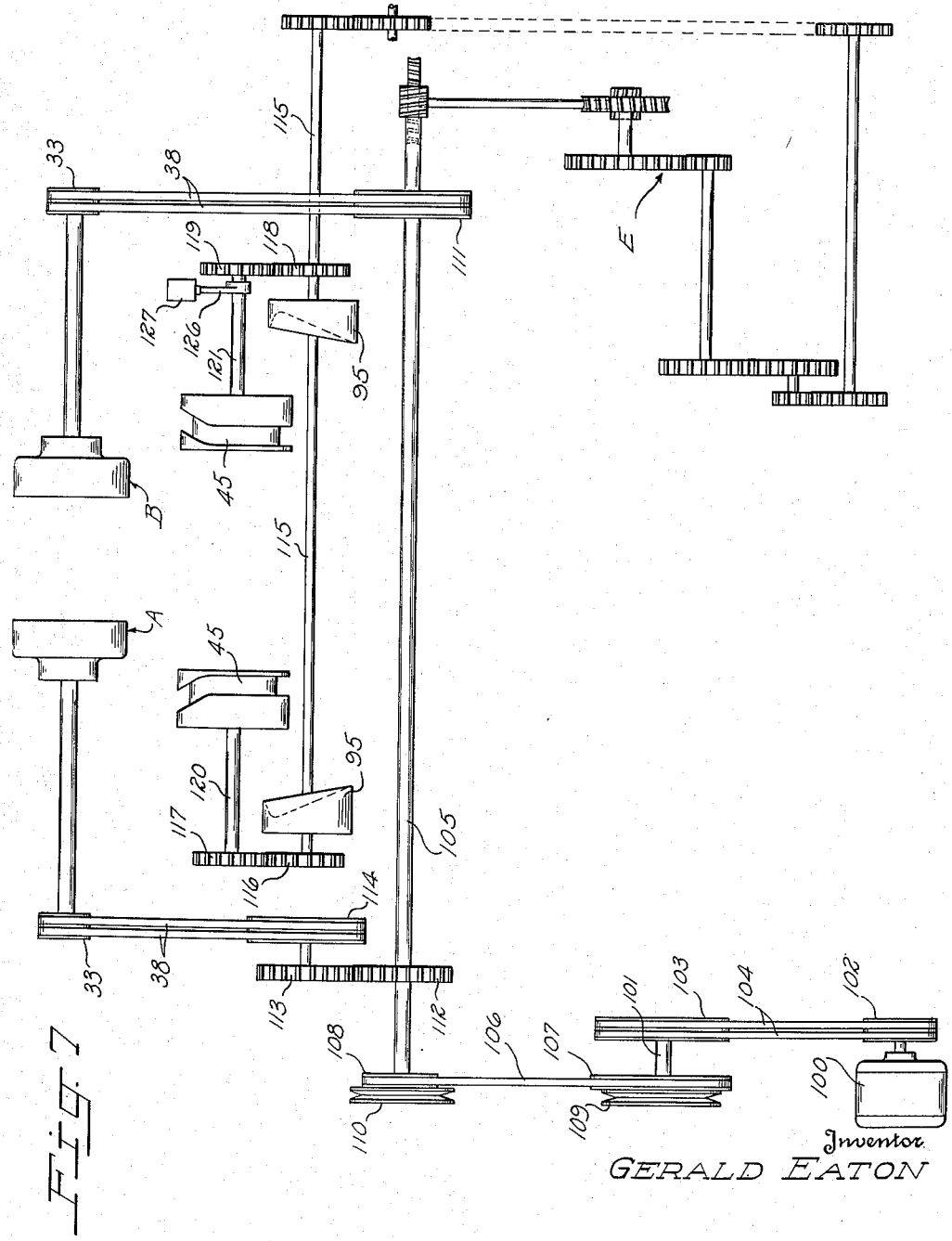

Patented Apr. 15, 1952

2,593,124

UNITED STATES PATENT OFFICE 2,593,124

WEDGE FACING MACHINE

Gerald Eaton, Manchester, Conn., assignor to The Taylor & Fenn Co., Hartford, Conn., a corporation of Connecticut Application September 23, 1948, Serial No. 50,756

6 Claims. (Cl. 82—2)

The present invention relates generally to machine tools and, more specifically, to a machine tool having particular utility in the manufacture of gate valves, said tool being constructed and arranged specifically for the facing of gate valve wedges.

In the manufacture of gate valves, the gate or wedge which functions to close and open the valve by movement toward and away from a wedging position in the body of the valve must be accurately faced, that is, provided with a pair of oppositely facing sloping sides or surfaces which provide the wedging or gate action. Gate valves are produced in large quantities and there is a great demand in the art for machines which will facilitate the manufacture of such wedges so that they may be made more cheaply and efficiently, i. e., with greater rapidity and with less labor, but at the same time without sacrificing the quality of the wedge, such as its accuracy and other desirable attributes.

It is an object of the invention to provide a machine for facing gate valve wedges which will operate at a high speed and which will operate upon both faces of the wedge simultaneously thus cutting down on the amount of time required in the operation of facing gate valve wedges. Included in this aim is the object of providing a machine which will rapidly move from an at rest or loading position to a cutting position and then back again to complete the cycle in a minimum of time.

It is a further aim of the invention to provide a machine for fabricating gate valve wedges which employs a new principle or mode of operation, that is, a machine which is built upon a new approach to the problem of accurately and quickly facing gate valve wedges, whereby a machine for accomplishing this highly useful and necessary function may be furnished which will overcome the disadvantages of prior art machines and will not differ only as a matter of degree or design.

Another object of the invention is to provide a machine of the character described which is entirely accurate in operation and dependable in service over long periods of time so that, despite the relatively large output of the machine, there will be a minimum of rejects and the wedges produced will consistently meet all of the necessary specifications.

It is a further object of the invention to accomplish the above aims in a machine which is of relatively simple construction and which is of improved design whereby the machine may be economically produced in large numbers.

Another object of the invention is to provide a machine of the type referred to which is foolproof in operation and simple to operate so that the same may be operated with a minimum of skilled labor and with a minimum of instruction.

A general object of the invention is to provide a machine which is of rugged and dependable construction and which meets the needs of present day commercial demands for a machine to render more economical and practical the manufacture of high grade gate valve wedges in large quantities.

Other objects will be in part obvious and in part pointed out more in detail hereinafter.

The invention accordingly consists in the features of construction, combination of elements and arrangements of parts which will be exemplified in the construction hereafter set forth and the scope of the application of which will be indicated in the appended claims.

In the drawings—

Fig. 3 is an enlarged, fragmentary plan view of one-half of the machine, the same being partially in cross section to show a spindle and cutterhead mechanism;

Fig. 4 is an end view of the cutterhead assembly utilized in this machine;

Fig. 7 is an enlarged, diagrammatic view of the driving elements of the machine.

Figure 1:
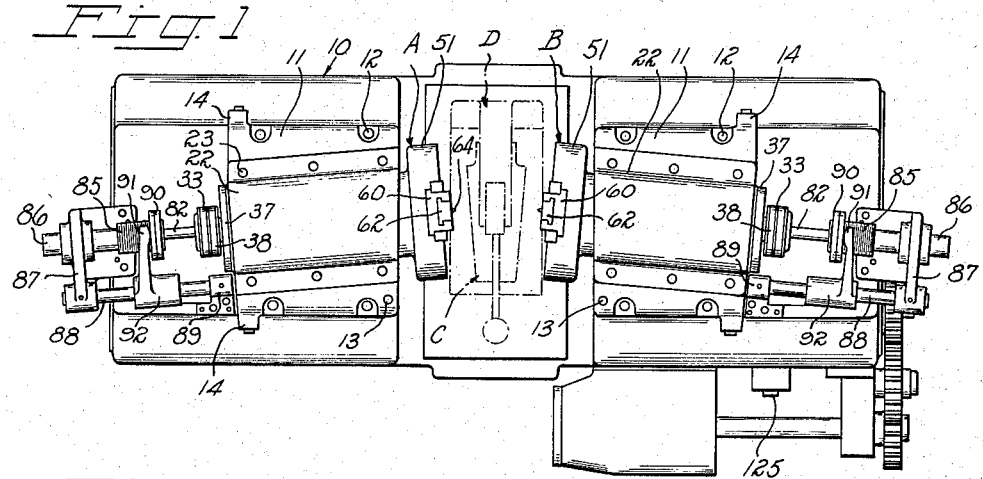
Figure 1 is a plan view of a wedge facing machine embodying the present invention.
Figure 2:
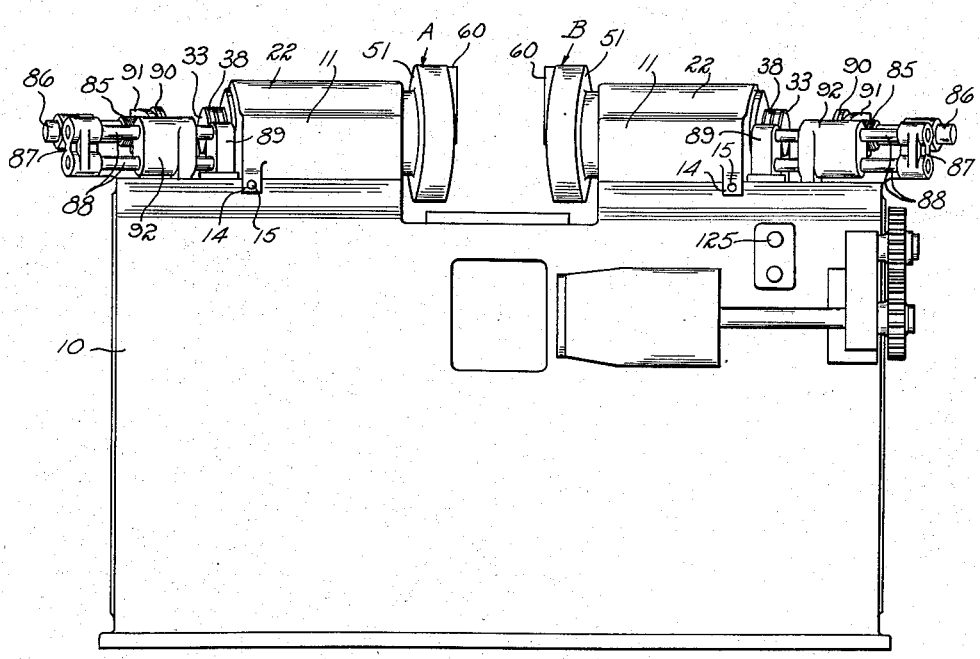
Fig. 2 is a front elevation of the machine.
Figure 5:
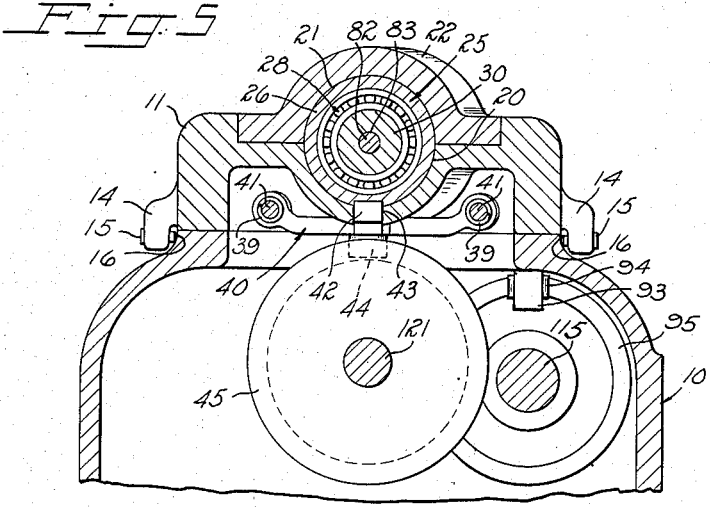
Fig. 5 is a cross sectional view taken along the line 5—5 of Fig. 3.
Figure 6:
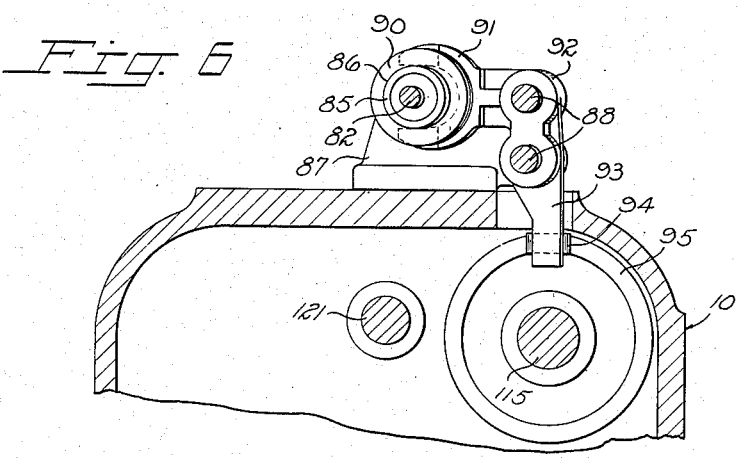
Fig. 6 is a cross sectional view taken along the line 6—6 of Fig. 3.

Referring to the drawings, the machine is provided with a base 10, of desired size, for supporting a pair of cutting heads A and B (to be described in more detail hereinafter) which are mounted on either side of the top of the base for rotary and reciprocal movement. As further explained hereinafter, these cutting heads A and B are mounted at an angle such that they will reciprocate perpendicular to, and rotate parallel to, the faces of a gate valve wedge C when the same is mounted in a suitable fixture D at the center of the machine as shown in dash and dot lines in Fig. 1 of the drawings.

The cutting heads A and B and their driving elements are exactly the same and, therefore, in the interests of brevity and conciseness, the same reference numerals will be used to designate identical parts and the description will be limited to but one of them.

The details of construction of the cutting heads A and B and their driving elements are best shown in Figs. 3 and 4 of the drawings. As shown in these figures, there is mounted toward one side of the base 10 a housing 11 which is adapted to be firmly fixed on the base 10 by means of bolts 12. Additional fastening means is provided by the pivot pin or dowel 13. In the preferred construction, there is a slight play between the bolts 12 and the openings in the housing 11 through which they extend whereby, when the bolts 12 are loosened, there may be a slight pivoting of the housing 11 with respect to the base. This permits a slight adjustment of the housing 11 and, as will be apparent later, the cutting heads A and B. To facilitate adjustment of the housing 11, there is provided at opposite sides thereof extensions 14 through which are threadably received set screws 15 which are engageable with the edges 16 of the base 10.

The housing 11 is provided with a semi-cylindrical bearing surface 20 which registers with a similar bearing surface 21 in a cover member 22 which is secured to the housing 11 by any suitable means such as the bolts 23. The cooperating bearing surfaces 20 and 21 form, in effect, a cylindrical bore for slidably receiving a spindle assembly 25. The spindle asembly 25 includes an outer tubular member 26 which is slidably supported by the bearing surfaces 20 and 21 so as to be slidable longitudinally therein. Mounted on the inside of the tubular member 26 are the outer races of roller bearing assemblies 28. The inner races of the roller bearing assemblies 28 are secured to the spindle 30 to which the cutting head A is secured, as explained hereinafter. The outer end 31 of the spindle 30 is splined so as to be non-rotatably but slidably positioned by the cylindrical member 32 which has at its outer end a double pulley 33 secured thereon by a nut 34. The cylindrical member 32 in turn is supported by ball bearings 35 mounted on a cylindrical insert 36 at the outer end of the bearing surfaces 20 and 21. An oil seal 37 encloses the outer portion of the bearings 35.

As will be apparent, when the double pulley 33 is driven as by means of the belts 38, there will be caused a rotation of the spindle 30 but at the same time the spindle 30 may be moved inwardly and outwardly by force applied longitudinally to the stationary tubular member 26.

Inward and outward movement of the tubular member 26 and hence the spindle 30 is provided by an arm 40 which is slidably supported at opposite ends on a pair of guide rods 41. Springs 39 on the rods 41 act to move the arm 40 in a spindle retracting direction. An upwardly extending lug 42 on the arm 40 engages the tubular member 26 through a slot 43 running longitudinally at the bottom of the bearing surface 20. Also secured to the arm 40 is a cam follower 44 which is adapted to engage in a cylindrical cam 45 to be described in more detail later. The rotation of the cam 45 is adapted to impart reciprocating motion of the spindle assembly 25 through the arm 40 and associated parts by moving the arm in one direction against the force of the springs 39 and then permitting the arm to retract under the influence of the springs. The use of the springs eliminates any lost motion.

The spindle 30 has a threaded portion 50 at its inner end onto which is secured the base 51 of the cutting head A. The base 51 is provided with an outer flat surface 52 to which are secured in parallel relationship by means of screws 53 a pair of gibs 54 which, in effect, provide a set of ways for certain of the moving parts of the head.

Slidably mounted in the gibs 54 is a radially movable slide 60 which, in turn, is formed with guideways 61 in which is slidably positioned a tool holder 62. The tool holder 62 may be radially adjusted in the guideways 61 and then locked into position by turning the screw 63. The cutting tool 64 which is a conically shaped hardened steel member is fixed to the outer end of the tool holder 62 so that the point projects outwardly from the end of the cutting head A where it will engage the wedge which is being faced.

Also slidably mounted in the gibs 54 is a counterslide 65 whose purpose is to counterbalance the slide 60 so as to overcome what would otherwise be an undesirable state of unbalance particularly when the spindle 30 is rotated at high speed.

The slide 60 and counterslide 65 are each provided with a backwardly extending tail portion 66 and 67, respectively, to which are affixed the inclined cams 68 and 69, respectively, and to which are secured by means of bolts 70 and 71, respectively, the counterweights 72 and 73. The counterweights partially counterbalance the slide 60 and counterslide 65 so as to render it easy to manipulate these slides at high speeds. Each of the counterweights is bored as at 75 to receive springs 76 which are therefore operable between the counterweights and the sides of the base 51. The centrifugal force exerted on the slides 60 and 65 when the spindle is rotated tends to move the slides outwardly, the springs 76 being provided to augment this force if necessary.

The slides 60 and 65 are adapted to be moved radially inwardly of the cutting head by pressure exerted against cams 68 and 69 by a roller 80 supported in a yoke 81 which is fixed to the end of a push rod 82. The push rod 82 is slidably received within a center bore 83 extending through the axis of the spindle 30. The opposite end of the push rod 82 is supported by a ball bearing assembly 84 which is carried in a threaded socket 85 on the end of a plunger 86. The plunger 86 is slidably supported by a bracket 87 to which is secured a pair of parallel guide rods 88, the rods 88 being supported by member 89 mounted on the base 10.

As will be apparent, the push rod 82 is adapted to be moved longitudinally with or independently of the spindle 30 and may rotate therewith. Longitudinal movement may be imparted to the push rod 82 by pressure upon the threaded socket 85. This is accomplished in the specific embodiment by the use of a nut 90 which is adjustably positioned on the threaded socket 85 and which is engaged by the yoke 91 of a lever arm 92. The lever arm 92 is slidably mounted on the guide rods 88, the two guide rods 88 being effective to prevent pivoting of the arm 92. An extension 93 on the arm 92 carries a cam follower 94 which is in engagement with a cylinder type cam 95 to be described later.

The driving mechanism for the spindle assemblies 25 and the cams 45 and 95 is best illustrated in the diagrammatic view thereof in Fig. 7 of the drawings. In this view, the spindle heads A and B are shown in line instead of at an angle to each other, but this has been done merely for convenience since the actual angle of operation is so relatively small that no further modification of the driving members is required to accommodate this tilted position of the heads and associated driving members. As shown in Fig. 7, the sole motive power for the entire machine is an electric motor 100 which drives an idler shaft 101 through pulleys 102 and 103 and belts 104. The idler shaft 101 is in turn connected to a main drive shaft 105 extending longitudinally for the full length of the machine. The connection between the drive shaft 105 and the idler shaft 101 is through a belt 106 which may be selectively placed on the pulleys 107 and 108 or pulleys 109 and 110 depending upon the desired speed of operation. One end of the main drive shaft 105 is provided with a double pulley 111 around which are carried the belts 38 which drive the pulley 33 of the spindle assembly 25 for operating the head B, as previously described.

The opposite end of the main drive shaft is connected through gears 112 and 113 with a double pulley 114 which, in turn, carries the belts 38 for driving the opposite spindle assembly 25 for operating the head A. The reason for the gears 112 and 113 is to cause rotation of the spindle assemblies in opposite directions, that is, with respect to each other but in the same direction with reference to the surface upon which they are intended to operate.

The free end of the main drive shaft 105 is connected through a step-down gear train generally denoted by the reference letter E to a countershaft 115 on which are mounted the cams 95 for operating the push rods 82 as previously described.

Through gears 116 and 117 on the one hand, and 118 and 119 on the other, countershaft 115 drives shafts 120 and 121 to which are fixed the cams 45 for reciprocating the spindle assemblies 25 as previously described.

In the operation of the machine, the operator places a wedge to be faced in the fixture D and then initiates operation of the machine by starting the motor 100 in any suitable manner such as by pressing the starting switch 125. Thereupon, the spindles 30 are driven from the main drive shaft 105 at high speed to rotate the cutting heads A and B and simultaneously with the high speed rotation of the cutting heads A and B the cams 45 and 95 are slowly rotated to move the machine elements through a complete cycle of operation.

The cams 45 which move the spindles 30 may be designed to give a fairly rapid longitudinal movement to the spindles at the outset so as to bring the tool heads A and B from the at rest position to closely adjacent the workpiece whereupon, during the cutting operation, the movement is made very gradual in keeping with the cutting speed. At the same time that the spindles 30 are moved longitudinally toward the workpiece, the push rods 82 are also moved in the same direction and at approximately the same speed by the action of the cams 95. The cams 95 are designed, however, to continue the longitudinal movement of the push rods 82 toward the workpiece after the longitudinal movement of the spindles has substantially ceased. This continued movement of the push rods 82 causes the slide 60 and thus the tool holder 62 to be moved radially inwardly of the tool heads thereby providing a cutting or facing action on the workpiece entirely across the surface being faced. Following this action, the push rods 82 are permitted to regain their original position relative to the spindles 30 thereby permitting the tool holders 62 to return to their original position by centrifugal force aided by the action of the springs 76 and thereafter the spindles 30 and push rods 82 are permitted to be retracted together by action of springs 39, again at a fairly rapid rate. When the machine has regained its original at rest position, an arm 126 fixed to the shaft 121 actuates the switch 127 to turn off the motor 100. The machine has thus completed a full cycle, the accurately and completely faced wedge may be removed from the fixture D and a new wedge to be faced inserted whereupon the operation of the machine is again initiated.

It thus will be seen that there has been provided, in accordance with the invention, a novel machine for facing gate valve wedges which is easy and simple to operate, which functions accurately and at high speeds to produce a high output of good work, and which may be relied upon for dependable service over long periods of time.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A wedge facing machine comprising a base, a fixture on the base for supporting a wedge to be faced, a pair of opposed hollow spindles disposed at right angles to the faces of a wedge supported in said fixture, said spindles being mounted on the base for rotational and longitudinal movement, a cutting head carried by each spindle, a radially slidable tool on each head, means including a push rod extending through the spindle and slidable axially therein for moving the tools radially of the heads, means for rotating the spindles in opposite directions, means for simultaneously advancing and retracting the spindles to engage and disengage the cutting tool with the wedge faces, and means for advancing the push rod relative to the spindles to cause radial movement of the cutting tools effective when the spindles are in said advanced position and during a cutting operation.

2. A wedge facing machine comprising a base, a fixture on the base for supporting a wedge to be faced, a pair of spindles mounted on the base for rotational and longitudinal movement, said spindles being arranged in opposed relationship normal to opposite faces of the wedge, a cutting head carried by each spindle, a radially movable cutting tool on each head, means for rotating the spindles, cam means for advancing the spindles toward the wedge and thereafter retracting them, and means for moving the cutting tools radially of the heads effective when the spindles have been advanced to cutting position comprising a push rod extending axially through each of said spindles and slidable axially therein, means on the end of the push rods for radially moving the cutting tools when the push rod is moved axially relative to the spindle, and cam operated means constructed and arranged to advance the push rods in timed relationship with the spindles until the spindles are advanced to cutting position and to further advance the push rod thereafter to cause radial movement of the tools during a cutting operation.

3. A wedge facing machine comprising a base, a pair of spindles mounted on the base at an angle to each other, each of said spindles comprising a first member mounted for rotational movement, and a second member slidable longitudinal of the first member but non-rotatable with respect thereto, means for rotating the first members, a cutting head mounted on each of said second members, a cutting tool radially slidable on each head, means including push rods extending through the second members and slidable endwise therein for moving the cutting tools radially of the heads, means for rotating the first members, and cam means for moving the second members and the push rods longitudinally in timed relationship while the said members are being rotated.

4. A wedge facing machine comprising a base, a pair of spindles mounted on the base at an angle to each other, each of said spindles comprising a hollow first member longitudinally fixed but rotatably mounted on the base, and a hollow second member slidable but non-rotatably mounted within the first member, a cutting head mounted on each of said second members, a cutting tool radially slidable on each head, means urging the tools radially outwardly of the heads, a push rod extending axially through said second members, cam means for moving the tools radially inwardly of the heads when the push rods are moved longitudinally relative to said second members, means for rotating the first members, cam operated means constructed and arranged for simultaneously advancing the second members and the push rods to engage the cutting tools with a wedge mounted between the heads and thereafter to further advance the push rods to move the cutting tools radially of the heads while the members are being rotated.

5. A wedge facing machine comprising a base, a fixture for supporting a wedge on the base, and means for simultaneously facing opposite sides of the wedge comprising a pair of spindles disposed on the base at right angles to said opposite sides of the wedge, each of said spindles comprising a rotatable first member fixed against longitudinal movement on the base, a second member longitudinally slidable on the first member but non-rotatable with respect thereto, and a non-rotatable third member slidable longitudinally with the second member, a cutting head carried by each of said second members, a cutting tool mounted for radial movement on each of the heads, means including push rods extending through the second members for actuating said cutting tools, means for rotating the first members, cam operated means for advancing and retracting the third members, and cam operated means for advancing and retracting the push rods.

6. A wedge facing machine comprising a base, a fixture for supporting a wedge centrally of the base, and means for simultaneously facing opposite sides of the wedge comprising a pair of spindles disposed on the base at right angles to opposite sides of the wedge, each of said spindles comprising a rotatable first member fixed against longitudinal movement on the base, a second member non-rotatably mounted on the base but movable longitudinally thereon, and a third member extending through the first and second members, said third member being longitudinally but non-rotatably movable with respect to the first member and rotatable but non-longitudinally movable with respect to the second member, a cutting head carried by each of said third members, a cutting tool mounted for radial movement on each of the heads, means including push rods extending through the third members for actuating the cutting tools, means for rotating the first members, means for advancing and retracting the second members, and means for advancing and retracting the push rods, said first and last named advancing and retracting means being operable in time relationship.

GERALD EATON.

REFERENCES CITED

The following references are of record in the file of this patent:

UNITED STATES PATENTS

| Number | Name | Date |
| --- | --- | --- |
| 138,789 | Church | May 13, 1873 |
| 341,876 | Bishop | May 18, 1886 |
| 836,715 | Smith | Nov. 27, 1906 |
| 1,967,454 | Storm et al. | July 24, 1934 |
| 2,225,127 | Oppenheim | Dec. 17, 1940 |
| 2,283,323 | Erhardt | May 19, 1942 |
| 2,486,977 | Peters | Nov. 1, 1949 |